US006831428B2

(12) United States Patent
Mandai

(10) Patent No.: US 6,831,428 B2
(45) Date of Patent: Dec. 14, 2004

(54) VIBRATOR CONTROLLING CIRCUIT

(75) Inventor: Tadao Mandai, Oizumi-machi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/413,582

(22) Filed: Apr. 15, 2003

(65) Prior Publication Data

US 2004/0124795 A1 Jul. 1, 2004

(30) Foreign Application Priority Data

Apr. 17, 2002 (JP) ....................................... 2002-114958

(51) Int. Cl.[7] ................................................ H02K 35/00
(52) U.S. Cl. ......................... 318/114; 318/128; 331/154
(58) Field of Search ................................. 318/114, 119, 318/126, 127, 128; 331/154

(56) References Cited

U.S. PATENT DOCUMENTS 5,596,311 A * 1/1997 Bess et al. ............... 340/384.7
5,955,799 A * 9/1999 Amaya et al. ................ 310/36
6,285,145 B1 * 9/2001 Otsubo et al. .............. 318/114

* cited by examiner

*Primary Examiner*—Thanh Lam
*Assistant Examiner*—Judson H. Jones
(74) *Attorney, Agent, or Firm*—Morrison & Foerster LLP

(57) ABSTRACT

In order to quickly stop vibration of a vibrator of a vibrator controlling circuit, according to the present invention, an intermittent signal is generated by a spring vibration control integrated circuit, a switching element is turned on/off based on the intermittent signal from the spring vibration control integrated circuit, an intermittent electric current is supplied to a spring vibrator by switching of the switching circuit and the spring vibrator is vibrated. When vibration of the spring vibrator is stopped, a signal opposite to that when the spring vibrator is vibrated is applied from the spring vibration control integrated circuit to the switching element so as to cause the spring vibrator to generate a force to attenuate vibration and to stop the vibrator from vibrating.

3 Claims, 2 Drawing Sheets

Prior Art

VIBRATOR CONTROLLING CIRCUIT

BACKGROUND OF THE INVENTION

1. Field of the Invention

This invention relates to a vibrator controlling circuit which is used in a portable telephone to notify a user of an incoming call.

2. Description of the Related Art

In portable telephones, notice of an incoming call has been widely carried out by sounding a ringing tone. However, since this causes other people annoyance in a meeting or on a train, notice of an incoming call has also been widely carried out by vibration of a spring vibrator recently.

FIG. 4 shows a conventional vibrator controlling circuit for vibrating a spring vibrator. When a calling signal is received by an antenna 1, a calling signal detection circuit 2 detects this calling signal and a power-supply voltage VDD is applied to a spring vibration control integrated circuit 3.

Waveform (A) in FIG. 3 shows a square-wave signal used in the conventional vibrator controlling circuit of FIG. 4. When a power-supply voltage VDD is applied to the spring vibration control integrated circuit 3, a square-wave signal as shown in (A) is generated from the spring vibration control integrated circuit 3. This square-wave signal is applied to a gate electrode of an N-channel MOSFET 4. Thereupon, the N-channel MOSFET 4 repeats an ON/OFF operation in that the same is turned on every time a square-wave signal is applied and is turned off when it disappears, and an intermittent power-source voltage VDD is applied from a power source to a spring vibrator 5.

FIG. 2 shows a spring vibrator 5 used in the conventional vibrator controlling circuit of FIG. 4. When an electric current flows through a coil 6 of the spring vibrator 5, this coil 6 is magnetized due to electromagnetic induction. When the coil 6 is magnetized, a magnet 9 in a leaf spring 8 provided on a substrate 7 is attracted. When the square-wave signal applied to the gate electrode of the N-channel MOSFET 4 becomes low level, the N-channel MOSFET 4 is turned off, and the electric current to the coil 6 is intercepted. When the electric current to the coil 6 is intercepted, the spring vibrator 5 is restored by resilience of the leaf spring 8. By repeating such an operation, the spring vibrator 5 vibrates and gives notice of an incoming call.

As mentioned above, when a calling signal is detected by the calling signal detection circuit 2, a power-source voltage VDD is applied to the spring vibration control integrated circuit 3, the N-channel MOSFET 4 is turned on/off, and an intermittent electric current is supplied to the spring vibrator 5, whereby the spring vibrator 5 is vibrated to give notice of an incoming call.

When the vibration of the vibrator 5 is switched off, a mere stop of the electric current to the spring vibrator 5 still allows the vibration of the leaf spring 8 to last for some time due to inertia of the structure, especially a weight 10 for a proper vibration of the leaf spring 8. This uncontrolled continued vibration is not desirable.

SUMMARY OF THE INVENTION

The invention provides a vibrator controlling circuit including a spring vibration control integrated circuit generating a first intermittent signal, a switching element performing an on and off operation based on the first intermittent signal applied by the spring vibration control integrated circuit, a spring vibrator vibrating based on the on and off operation of the switching element, and a cycle delaying signal generating circuit applying a delay signal to the spring vibration control integrated circuit when the vibration of the spring vibrator is forced to stop. The spring vibration control integrated circuit applies to the switching element in response to the delay signal a second intermittent signal which is a reversal of the first intermittent signal.

The invention also provides a vibrator controlling circuit including a spring vibration control integrated circuit generating a first square-wave signal when a calling signal is detected, a metal oxide semiconductor filed effect transistor performing an on and off operation based on the first square-wave signal applied by the spring vibration control integrated circuit, a spring vibrator vibrating based on the on and off operation of the transistor, and a cycle delaying signal generating circuit applying a delay signal to the spring vibration control integrated circuit when the calling signal is not detected, the spring vibration control integrated circuit applies to the switching element in response to the delay signal a second square-wave signal which has a phase shifted from a phase of the first square-wave signal.

DETAILED DESCRIPTION OF THE INVENTION

Now, a vibrator controlling circuit of an embodiment of this invention will be described with reference to FIG. 1 to FIG. 3.

Figure 1:
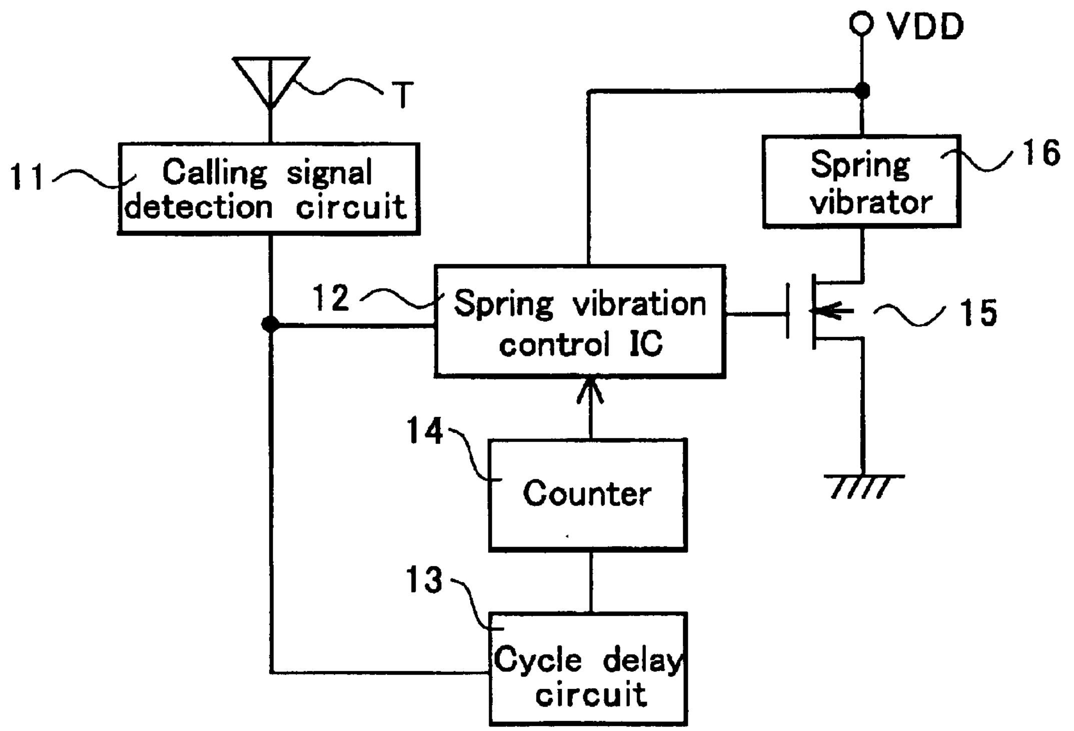
FIG. 1 is a block diagram of a vibrator controlling circuit of an embodiment of this invention.

FIG. 1 is a block diagram of the vibrator controlling circuit of this invention. A calling signal detection circuit 11 detects a calling signal received by an antenna T. A spring vibration control integrated circuit 12 receives a power-source voltage VDD and generates a square-wave signal when the calling signal is detected by the calling signal detection circuit 11.

A cycle delaying circuit 13 generates a delaying signal when the calling signal from the calling signal detection circuit 11 is stopped. The delaying signal generated from the cycle delaying circuit 13 is applied for a fixed period via a counter 14 to the spring vibration control integrated circuit 12. When the delaying signal is applied to the spring vibration control integrated circuit 12, if duty of the square-wave signal is 50%, a square-wave signal whose cycle is delayed by ½ compared to that in the vibrating operation is generated from the spring vibration control integrated circuit 12.

An N-channel MOSFET 15 is ON for a period where a square-wave signal generated from the spring vibration control integrated circuit 12 is at high level, and is OFF for a period when it is at low level. To the spring vibrator 16, a coil current intermittently flows every time the N-channel MOSFET 15 is turned on/off.

Figure 2:
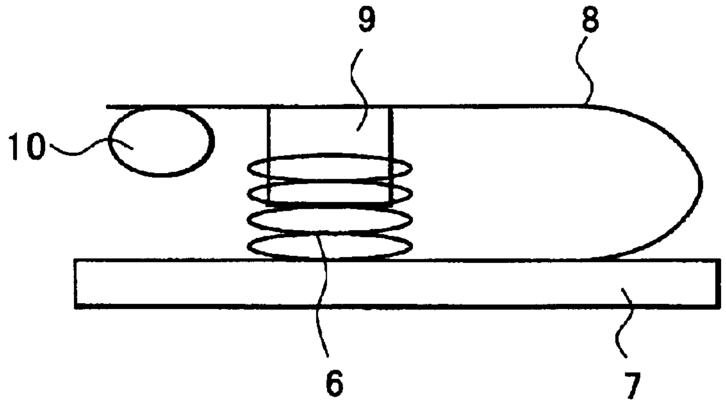
FIG. 2 is a side view of a vibrator used in the vibrator controlling circuit of this embodiment.

This embodiment also uses the spring vibrator shown in FIG. 2. As shown in the figure, the spring vibrator 16 includes a coil 6 which is attached on a substrate 7 and through which the intermittent coil current flows, a leaf spring 8 whose one end is provided on the substrate 7, and a weight 10 provided so that a magnet 9 provided on the leaf spring 8 and the leaf spring 8 appropriately vibrate.

Now, the operation of the vibrator controlling circuit of this embodiment will be described. When a calling signal is received by the antenna T, the calling signal is detected by the calling signal detection circuit 11, and the power-source voltage VDD is applied to the spring vibration control integrated circuit 12.

Figure 3:
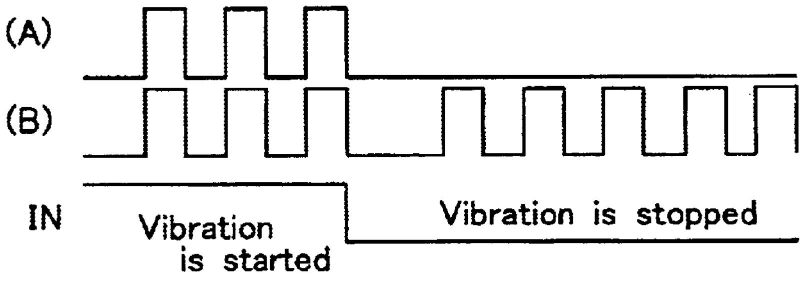
FIG. 3 shows a signal waveform for switching the switching transistor of this embodiment in comparison to the conventional signal wave form.
Figure 4:
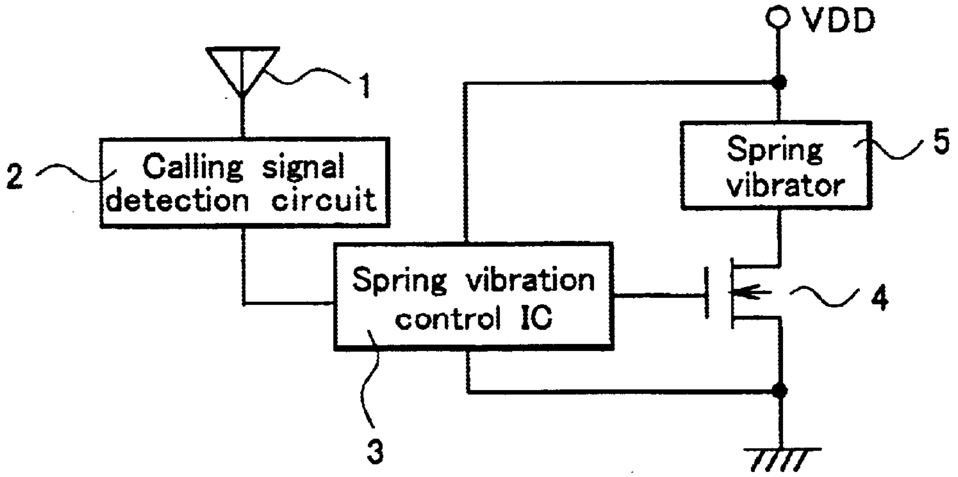
FIG. 4 is a block diagram of a conventional vibrator controlling circuit.

FIG. 3 compares a square-wave signal (B) of this embodiment to the square-wave signal (A) of the conventional device of FIG. 4. When a power-source voltage VDD, for example 3V, is applied to the spring vibration control integrated circuit 12, the square-wave signal as shown in (B) is generated from the spring vibration control integrated circuit 12. The square-wave signal is a square-wave signal whose duty is 50% at 100 Hz and is applied to a gate electrode of the N-channel MOSFET 15. The N-channel MOSFET 15 repeats an ON/OFF operation in that the same is turned on every time a square-wave signal becomes high level and is turned off when it becomes low level, and an intermittent coil current is applied from a power source to a spring vibrator 16.

As shown in FIG. 2, when the coil current flows through the coil 6 of the spring vibrator 16, the coil 6 is magnetized due to electromagnetic induction. When the coil 6 is magnetized, the magnet 9 in the leaf spring 8 is attracted. When the square-wave signal applied to the gate electrode of the N-channel MOSFET 15 becomes low level, the N-channel MOSFET 15 is turned off and the electric current to the coil 6 is interrupted, therefore, the spring vibrator 5 is restored by resilience of the leaf spring 8. By repeating such an operation, the spring vibrator 5 vibrates and gives notice of an incoming call.

As mentioned above, in a case where the spring vibrator 16 performs vibration based on detection of a calling signal, when a square-wave signal from the spring vibration control integrated circuit 12 is high level, the N-channel MOSFET 15 is turned on, due to electromagnetic induction caused by the electric current that flows through the coil 6 provided on the substrate 7, an attracting effect works between the coil 6 and magnet 9, the leaf spring 8 is attracted toward the substrate 7 and approaches thereto, and when the square-wave signal is low level, the N-channel MOSFET 15 is turned off, an electric current to the coil 6 is interrupted, and the leaf spring 8 becomes distant from the substrate 8 by its own resilience.

However, when the calling signal is not detected any longer, if a delaying signal from the cycle delaying signal generating circuit 13 is applied to the spring vibration control integrated circuit 12 via the counter 14, the phase of a square-wave signal generated from the spring vibration control integrated circuit 12 is delayed by a ½ cycle. Thereupon, since the duty of the square-wave signal is 50%, an ON/OFF period of the N-channel MOSFET 15 is inverted compared to that in the vibrating operation.

Accordingly, when a force in a direction away from the substrate 7 effects the aforementioned leaf spring 8 due to resilience, the N-channel MOSFET 15 is turned on and allows the coil current to flow to the coil 6. Therefore, since a force in a direction toward the substrate 7 works on the leaf spring 8 due to electromagnetic induction, the vibration of the leaf spring 8 is suppressed. The number of the vibrations of the leaf spring 8 between the cease of detecting the calling signal and the ending of the vibration thereafter is determined beforehand. This number is, for example, 1–20. The counter 14 counts the number of delaying signals from the cycle delaying signal generating circuit 13, and the operation of the cycle delaying signal generating circuit 13 stops when the counted number reaches the predetermined number.

What is claimed is:

1. A vibrator controlling circuit comprising:

a spring vibration control integrated circuit generating a first intermittent signal;

a switching element performing an on and off operation based on the first intermittent signal applied by the spring vibration control integrated circuit;

a spring vibrator vibrating based on the on and off operation of the switching element; and a cycle delaying signal generating circuit applying a delay signal to the spring vibration control integrated circuit when the vibration of the spring vibrator is forced to stop, the spring vibration control integrated circuit applying to the switching element in response to the delay signal a second intermittent signal which is a reversal of the first intermittent signal.

2. A vibrator controlling circuit comprising:

a spring vibration control integrated circuit generating a first square-wave signal when a calling signal is detected;

a metal oxide semiconductor field effect transistor performing an on and off operation based on the first square-wave signal applied by the spring vibration control integrated circuit;

a spring vibrator vibrating based on the on and off operation of the transistor; and a cycle delaying signal generating circuit applying a delay signal to the spring vibration control integrated circuit when the calling signal is not detected, the spring vibration control integrated circuit applying to the transistor in response to the delay signal a second square-wave signal which has a phase shifted from a phase of the first square-wave signal.

3. The vibrator controlling circuit of claim 2, further comprising a counter circuit counting the number of the delay signals applied by the cycle delaying signal generating circuit to the spring vibration control integrated circuit, wherein the cycle delaying signal generating circuit stops the application of the delay signal when the counted number of the delay signals reaches a predetermined number.

* * * * *